(12) United States Patent
LaFarelle et al.

(10) Patent No.: US 9,350,917 B2
(45) Date of Patent: *May 24, 2016

(54) MISREGISTRATION CORRECTION

(71) Applicant: Raytheon Company, Waltham, MA (US)

(72) Inventors: Sarah A LaFarelle, Wylie, TX (US); Archie Henry Muse, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,106

(22) Filed: May 7, 2014

(65) Prior Publication Data

US 2014/0334686 A1  Nov. 13, 2014

Related U.S. Application Data

(60) Provisional application No. 61/820,902, filed on May 8, 2013.

(51) Int. Cl.
| | |
|---|---|
| *G06T 5/00* | (2006.01) |
| *H04N 5/372* | (2011.01) |
| *G06T 7/20* | (2006.01) |
| *H04N 5/232* | (2006.01) |

(52) U.S. Cl.
CPC ............ *H04N 5/23267* (2013.01); *G06T 5/003* (2013.01); *G06T 5/006* (2013.01); *G06T 7/2033* (2013.01); *H04N 5/372* (2013.01); *G06T 2207/20201* (2013.01); *G06T 2207/30241* (2013.01)

(58) Field of Classification Search
CPC ............ H04N 3/1525–3/1543; H04N 3/1581; H04N 3/1587; H04N 5/23248–5/2329; H04N 5/372–5/3728; G06T 7/20–7/2093; G06T 5/006; G01C 11/00
See application file for complete search history.

(56) References Cited

U.S. PATENT DOCUMENTS

| | | | | |
|---|---|---|---|---|
| 2013/0011020 A1* | 1/2013 | Kamoshida | ........ | H04N 5/23267 382/107 |
| 2015/0319379 A1* | 11/2015 | Nussmeier | ............... | H04N 5/33 348/165 |

OTHER PUBLICATIONS

Mingyang et al., "Real-Time Motion Tracking on a Cellphone using Inertial Sensing and a Rolling-Shutter Camera", 2013 IEEE International Conference on Robotics and Automation (ICRA), Karisruhe, Germany May 6-10, 2013, pp. 4712-4719.

(Continued)

*Primary Examiner* — Paul Berardesca
(74) *Attorney, Agent, or Firm* — Burns & Levinson, LLP; Joseph M. Maraia

(57) ABSTRACT

A method of misregistration correction in a line scanning imaging system includes: generating a model of scan motion over a focal plane of the imaging system, using a coupled system of scan equations with constant coefficients; estimating programmed motion positions across a plurality of detector junction overlap regions via a state transition matrix solution to the scan equations; at each detector junction overlap region, measuring actual motion positions via image correlation of overlapping detectors; generating differences between the actual motion positions and the estimated programmed motion positions; estimating updates to the constant coefficients based on the generated differences; generating corrections from the estimated updates to remove unwanted motion; and applying the updates to the constant coefficients.

13 Claims, 7 Drawing Sheets

(56) References Cited

OTHER PUBLICATIONS

Janschek et al., "Integrated Camera Motion Compensation by Real-Time Image Motion Tracking and Image Deconvolution", Proceedings of the 2005 IEEE/ASME, International Conference on Advanced Intellegent Mechatronics, Montery, CA Jul. 24-28, 2005, pp. 1437-1444.

Dickmanns et al., "Applications of Dynamic Monocular Machine Vision", Machine Vision and Application, 1 Springer Verlag, DE vol. 1, Jan. 1, 1988, pp. 241-261.

Bhaskar et al., "Model Based Processing of Signals: A State Space Approach", Proceedings of the IEEE, IEEE. New York, US., vol. 80, No. 2, Feb. 1, 1992, pp. 283-309.

* cited by examiner

MISREGISTRATION CORRECTION

RELATED APPLICATION

This application claims the benefit of U.S. Provisional Patent Application No. 61/820,902, filed in the U.S. Patent and Trademark Office on May 8, 2013, the entire contents of which are incorporated herein by reference.

BACKGROUND

1. Technical Field

This disclosure relates to generation of images of remote objects and, more particularly, to generation of corrected images generated from a scanning sensor on a moving platform.

2. Discussion of Related Art

Using line scanning, an electro-optical sensor can acquire image data for a remote object while in motion. Support data associated with each acquisition by the sensor contains measurement histories for position, velocity, attitude angles and rates, and a priori error variances. Accurate support data is important to the image formation process, as errors can manifest themselves as geometric artifacts.

Misregistration correction (MRC) is a component in the image formation chain of a line scanning electro-optical sensor. MRC removes the geometric artifacts introduced by un-programmed motion, which is unwanted motion not commanded as part of the image acquisition process. It can arise from vibrations, sensor attitude and position knowledge errors, etc.

SUMMARY

According to one aspect, a method of misregistration correction in a line scanning imaging system is provided. The method includes: generating a model of scan motion over a focal plane of the imaging system, using a coupled system of scan equations with constant coefficients; estimating programmed motion positions across a plurality of detector junction overlap regions via a state transition matrix solution to the scan equations; at each detector junction overlap region, measuring actual motion positions via image correlation of overlapping detectors; generating differences between the actual motion positions and the estimated programmed motion positions; estimating updates to the constant coefficients based on the generated differences; generating corrections from the estimated updates to remove unwanted motion; and applying the updates to the constant coefficients.

In some exemplary embodiments, estimating updates is performed using least-squares estimation. In some exemplary embodiments, the image correlation comprises normalized cross-correlation. In some exemplary embodiments, the image correlation comprises lag product cross-correlation. In some exemplary embodiments, the image correlation comprises least squares cross-correlation.

In some exemplary embodiments, the model of scan motion is generated over a predetermined time interval.

In some exemplary embodiments, the scan equations comprise a set of differential equations with constant coefficients. In some exemplary embodiments, the differential equations are first-order differential equations.

In some exemplary embodiments, the scan equations are linear.

In some exemplary embodiments, the method further includes computing the scan equation coefficients using sensor platform parameters. In some exemplary embodiments, the sensor platform parameters comprise at least one of sensor position, velocity, attitude angles and rates. In some exemplary embodiments, the method further includes approximating errors in the scan equation coefficients from measurement errors in the platform parameters. In some exemplary embodiments, the method further includes generating a covariance matrix of focal plane coordinate errors. In some exemplary embodiments, the method further includes estimating platform parameter errors from the differences between the actual motion positions and the estimated programmed motion positions.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
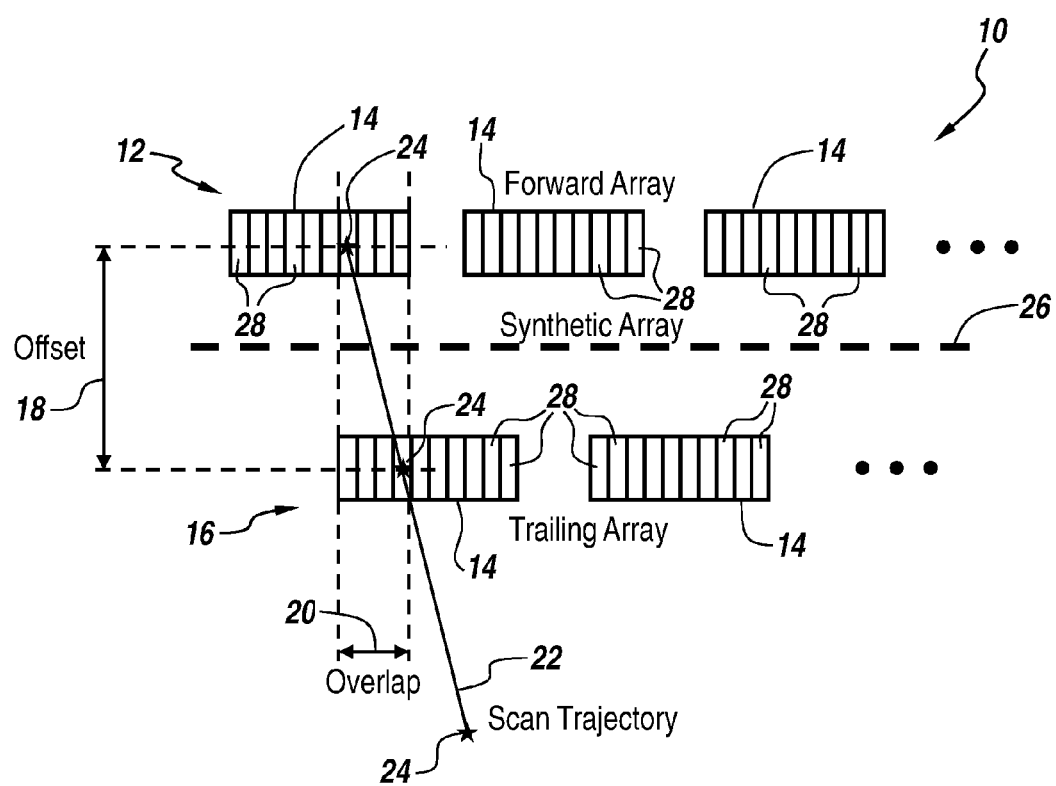
FIG. 1 includes a schematic diagram of a focal plane scanning geometry/configuration.

The present disclosure describes an innovative new approach for computing and applying required MRC. The approach of the disclosure simultaneously estimates and corrects un-programmed image motion (linear, oscillatory, and random); while enabling estimation of sensor knowledge errors in position, velocity, attitude angles, and attitude angle rates. According to the present disclosure, focal plane scan motion is modeled, over a sufficiently short time interval, via a coupled system of first-order differential equations with constant coefficients. Programmed motion positions across each detector junction overlap region are estimated via a state transition matrix solution to the scan equations. At each overlap junction, the actual motion positions are measured via image correlation of the overlapping detectors, and differences between these and the predicted locations are generated. A least-squares estimate is applied to update the scan coefficients based on these error residuals, i.e., differences. The corrections necessary to remove the unwanted motion are computed from these coefficient updates, and then applied.

Thus, according to some exemplary embodiments, error propagation is formulated via perturbations to the state transition matrix, which does not require that motion errors be estimated separately by category (rectilinear, oscillatory, and random). A robust and computationally efficient algorithm results. The rigorous error propagation model employed inherently characterizes statistical consistency, which enables identification of junction measurement "outliers," and reinforces robustness. The formulation of scan coefficient updates enables estimation of knowledge errors in sensor position, velocity, attitude angles, and attitude angle rates. Accuracy is enhanced by an iteration process based on these knowledge errors.

According to some exemplary embodiments, a covariance model relates scan coefficient errors to focal plane coordinate errors. According to these embodiments, a position in the focal plane of a line scanning electro-optical sensor is selected at some specified time during a scan. This image point corresponds to some ground point. It is assumed all the support data values necessary to define the scan (sensor position and velocity, attitude angles and rates) and the accuracy with which these parameters are known (mean errors, covariance), are available. Next, a computation is made, via closed form expressions, of the error statistics (means, covariance) in the projected location of the ground point's image at some small time increment later in the scan. These statistics are performance important for the image formation chain.

According to these embodiments, the error propagation occurs in three steps. First, given random errors (means, and covariance) in the scan coefficients, accurate approximations for the resulting focal plane coordinate errors (means, and covariance) are derived in closed form. Scan coefficient errors arise because the platform parameters (sensor position, velocity, attitude angles and rates) employed in their computation all contain random measurement errors. Next, accurate approximations for the random errors in the scan coefficients (and their joint probability distribution) are derived in closed form from the random measurement errors in the platform parameters. Finally, combining these two steps completes the solution.

According to these embodiments, this new approach produces an accurate closed-form expression for predicting the performance errors in projected focal plane scan coordinates. This is a major improvement over the existing scheme of Monte Carlo simulation, which is computationally cumbersome. Furthermore, the accurate closed form enables on-the-fly computation of performance quality measures for band-to-band registered exploitation products. Such metrics are in demand by the user community. These accurate closed-form expressions also facilitate on-the-fly statistical consistency and outlier checks for the junction measurements that are important for misregistration correction.

According to some exemplary embodiments, platform error estimation is also provided. Errors in projected focal plane coordinates are estimated during image formation via a correlation process in the detector junction overlap regions across the array. A goal is to estimate from these measured coordinate residuals knowledge errors in the support data; thus, improving image quality.

According to these embodiments, given random errors in the scan coefficients, accurate approximations for the resulting focal plane coordinate errors, as would be measured by the detector junction correlation process, are derived in closed form. Scan coefficient errors arise because the sensor position, velocity, attitude angles and rates employed in their computation contain measurement errors. Expressions relating the scan coefficient errors to the measurement errors in the platform parameters (position, velocity, attitude angles and rates) are then derived. These two intermediate expressions are then combined into a least-squares estimator relating measured detector junction coordinate residuals to platform parameter knowledge errors.

According to these embodiments, this new approach produces accurate estimates for platform parameter knowledge errors from the measured detector junction coordinate residuals on a line-by-line basis. Improving the accuracy with which platform parameters are known positively impacts overall image quality. Furthermore, the error estimates obtained from the initial execution of this approach can be applied to the original platform parameter measurement histories, and the updated histories employed to iterate another pass of junction measurements and further tighten overall knowledge accuracy. This approach facilitates on-the-fly statistical consistency and outlier checks for the junction measurement process.

MRC approaches employed in previous applications have a number of fundamental issues that are rectified by the approach described herein. Previous MRC approaches were formulated for outdated processing speed constraints, and were replete with heuristics.

A unified approach is described herein that is based on a rigorous mathematical formulation, which is well documented and computationally robust. This new MRC approach estimates error propagation through the linear scan equations via a $1^{st}$-order perturbation of the state transition matrix and the associated forcing vector via additive scan coefficient errors. Consequently, it treats total error without the need for separately estimating linear, oscillatory and random errors. The rigorous error propagation model employed in the approach described herein characterizes statistical consistency, which enables identification of junction measurement "outliers," and reinforces robustness. Its formulation of scan coefficient updates enables estimation of knowledge errors in sensor position, velocity, attitude angles, and attitude angle rates via an inversion process. Accuracy is further enhanced by an iteration process based on these knowledge errors.

A typical traditional MRC approach is now described as a reference point for the detailed description of the approach of the exemplary embodiments, which begins in section 3 below. In terms of nomenclature, the term "programmed motion" used herein refers to commanded motion that is planned as part of the sensor's image acquisition process. Specifically, it is the motion of the image of a selected stationary ground point across the focal plane during a commanded scan. The terms "un-programmed motion," "image motion error" or "focal plane coordinate errors" refer to the motion of the image of a selected stationary ground point across the focal plane, which differs from the commanded motion, and can occur due to attitude errors, vibrations, or a number of other causes.

Previous electro-optical line scanning systems were based on a post-correction pinhole camera model. Specifically, for these systems it was assumed that either corrections for optical distortion, atmospheric refraction, etc., had been successfully executed prior to formulation of the focal plane scan equations, or these correction terms were insignificant. The resulting linear scan equations were employed to implement a multi-stage MRC algorithm.

The scan equations were derived by direct differentiation of the pinhole camera projection equations with respect to time. All the parameters of the pinhole camera model were allowed to vary with time except for the coordinates of the ground point of interest, camera focal length, and the camera principal point coordinates. The resulting scan equations were a coupled system of linear, $1^{st}$-order, differential equations with six time varying coefficients. Ideally, one would supply the time histories of the sensor position, velocity, attitude angles, and attitude angle rates, compute the scan six time varying coefficients, and solve the system of differential equations.

In general, these differential equations were found to be a difficult, if not impossible, problem to solve in closed form without the simplifying assumptions. The simplifying assumption that was adopted is to consider a time increment sufficiently small to ensure that one can accurately consider the computed scan coefficients to be constant over this interval. One then solves the resulting equations and utilizes this solution until the time constraint has been reached. One then repeats the process until the entire time period has been covered increment-by-increment.

FIG. 1 includes a schematic diagram of a focal plane scanning geometry/configuration. The scan configuration 10 includes a forward array 12 of sensor modules 14 and a trailing array 16 of sensor modules 14. Each sensor module 14 includes a plurality of sensors 28 disposed linearly. The sensor modules 14 of the forward array 12 are staggered with respect to the sensor modules 14 of the trailing array 16, such that an overlap 20 of sensor modules is created. The forward array 12 and trailing array 16 are offset by an offset 18. Through appropriate processing of received sensor data, the forward array 12 and trailing array 16 combine to form a synthetic array 26, as shown in phantom in FIG. 1. During scanning image data collection, an object 24 is first detected by the forward array 12, and, due to the motion of the sensor platform, the object 24 is then detected by trailing array 16. The object 24 follows a scan trajectory 22 along the arrays 12 and 16. Previous approaches involved electro-optical line scanning sensors with offset and overlapping detector placements, as illustrated in FIG. 1.

The solution to the scan equations was employed to predict the object crossing points of the leading (forward) array 12 and the trailing array 16 of the scan trajectory 22 of an image point. One then correlated the detector responses of the forward and trailing arrays within each overlap region 20 to determine the actual shift in positions of the crossing points. Any variation between the predicted shift and the measured shift would be used to estimate the impact of any unplanned motion present, and correct for it during formation of the synthetic image array.

Figure 2:
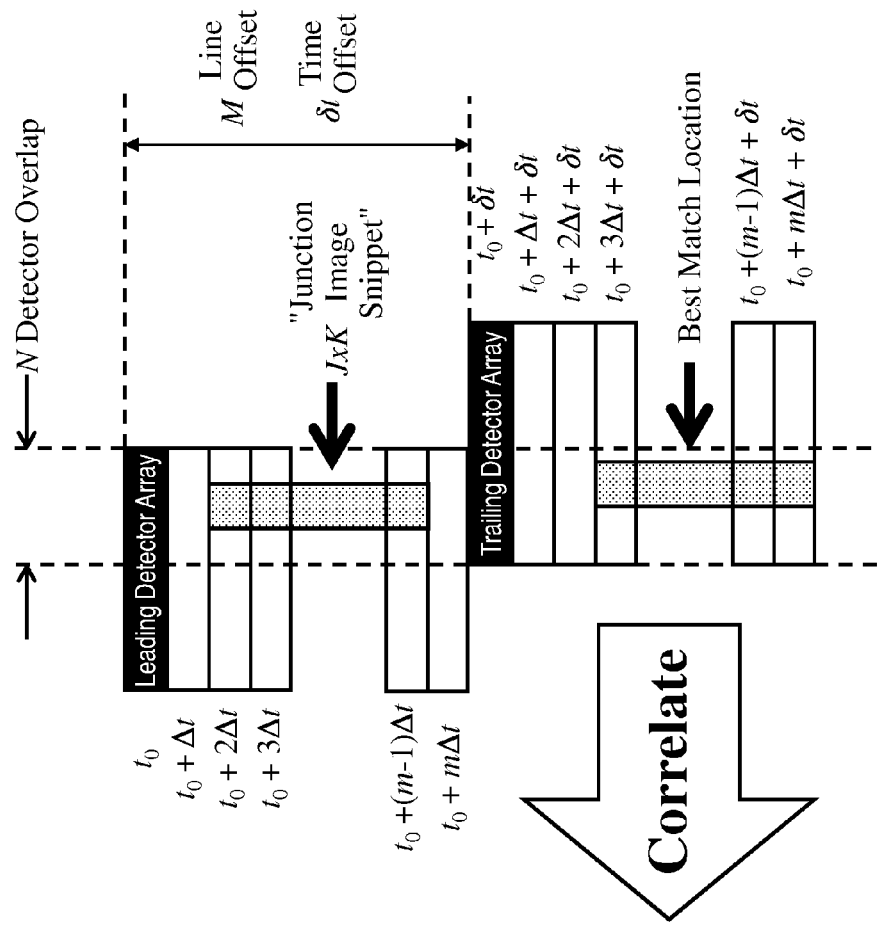
FIG. 2 is a schematic functional flow diagram of a detector junction correlation process.
Figure 2:
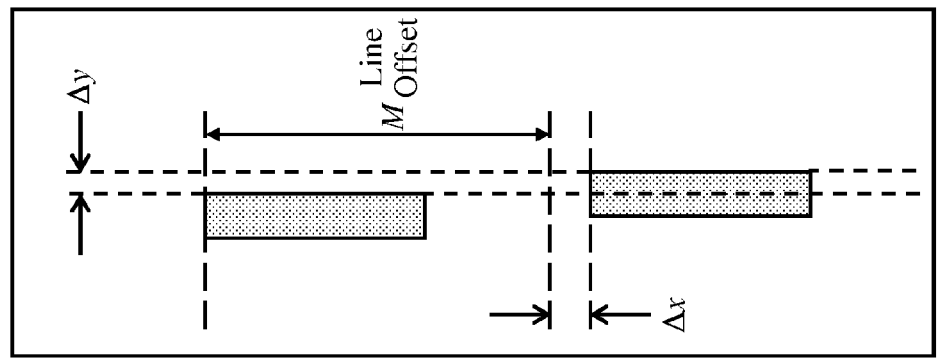

One exemplary detector junction correlation process is illustrated in FIG. 2, which is a schematic functional flow diagram of a detector junction correlation process. The correlation process employs the fact that the leading and trailing arrays "see" the same image but at different times. The correlator can be a normalized cross correlator, a lag product cross correlator, a least squares cross correlator, or other known cross correlator. The image correlator is used to determine where a selected portion of the image viewed by the leading array 12 best aligns with the image seen by the trailing array 16. This provides a measured set of focal plane coordinates that can be compared with where the match was predicted via the scan equation solution employing support data parameters.

Figure 3:
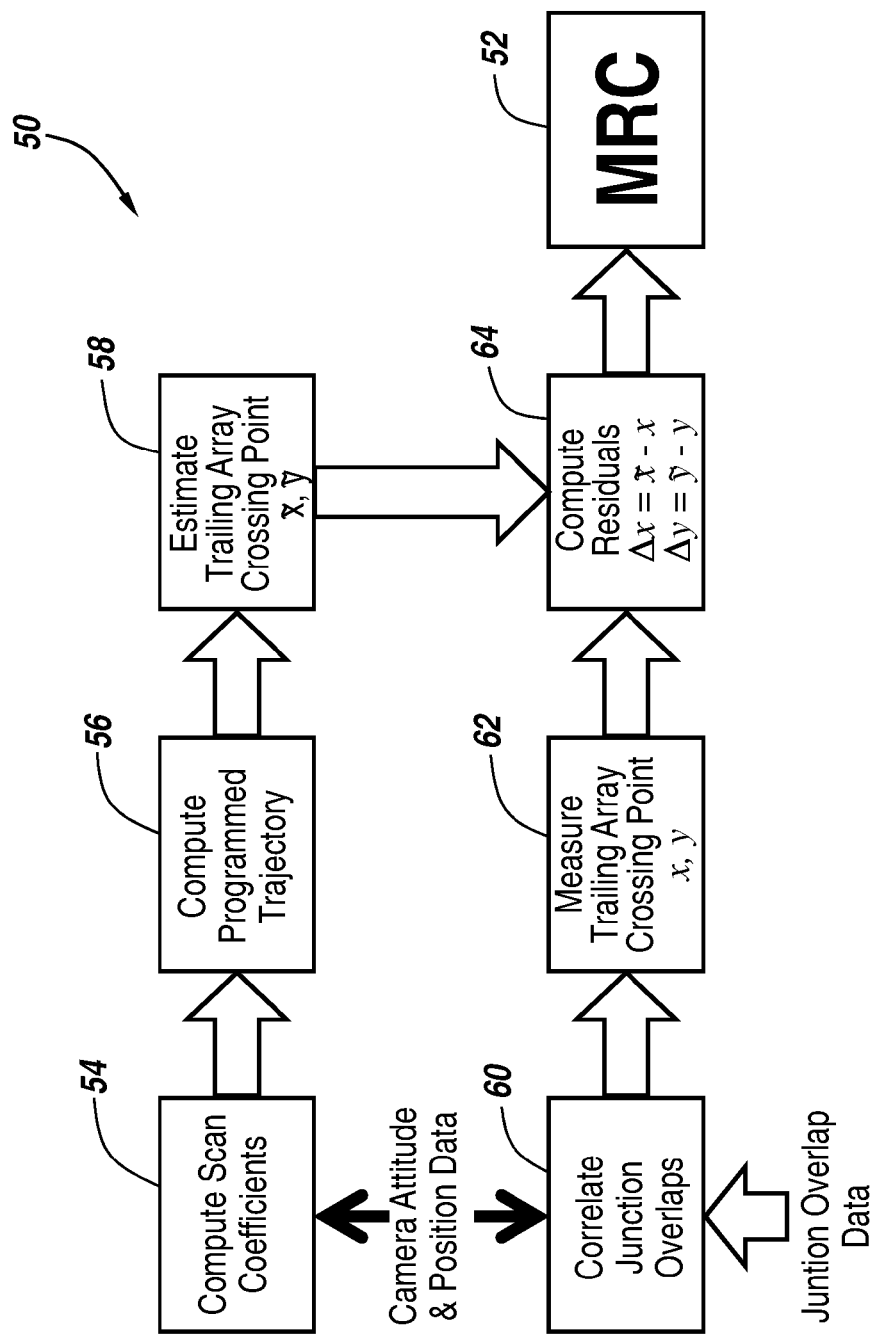
FIG. 3 includes a schematic functional block diagram of a detector junction measurement process.

In general, the highest measurable spatial frequency of a motion disturbance is a function of line rate and array separation. FIG. 3 includes a schematic functional block diagram of the detector junction measurement process 50. According to the process 50, the difference between the measured and predicted focal plane coordinates feed the MRC process 52. Referring to FIG. 3, scan coefficients are computed 54, using camera attitude and position data. Using the computed scan coefficients, programmed trajectory is also computed 56. Using the computed programmed trajectory, the trailing array crossing point is estimated 58. In parallel, also using camera attitude and position data as well as the junction overlap data, junction overlaps are correlated 60. Using the correlation of the junction overlaps, the trailing array crossing point is measured 62. The differences or residuals between the trailing array crossing estimate 58 and the measured trailing array crossing point are computed 64. As noted above, these differences or residuals are fed to the MRC process 52.

Thus, in previous approaches, the focal plane coordinate error residuals obtained from the detector junction measurements were employed to estimate the amount of un-programmed motion due to unwanted linear, oscillatory, and random motion. The quantified amount of un-programmed motion in these categories was then "corrected" when forming the synthetic image array: One subtracted out the unwanted displacements when mapping the synthetic array interpolation locations.

In the following sections numbered 1 through 6, preferred embodiments which overcome drawbacks and disadvantages of the previous approaches are described in detail.

1. Derivation of the Scan Equations

Figure 4:
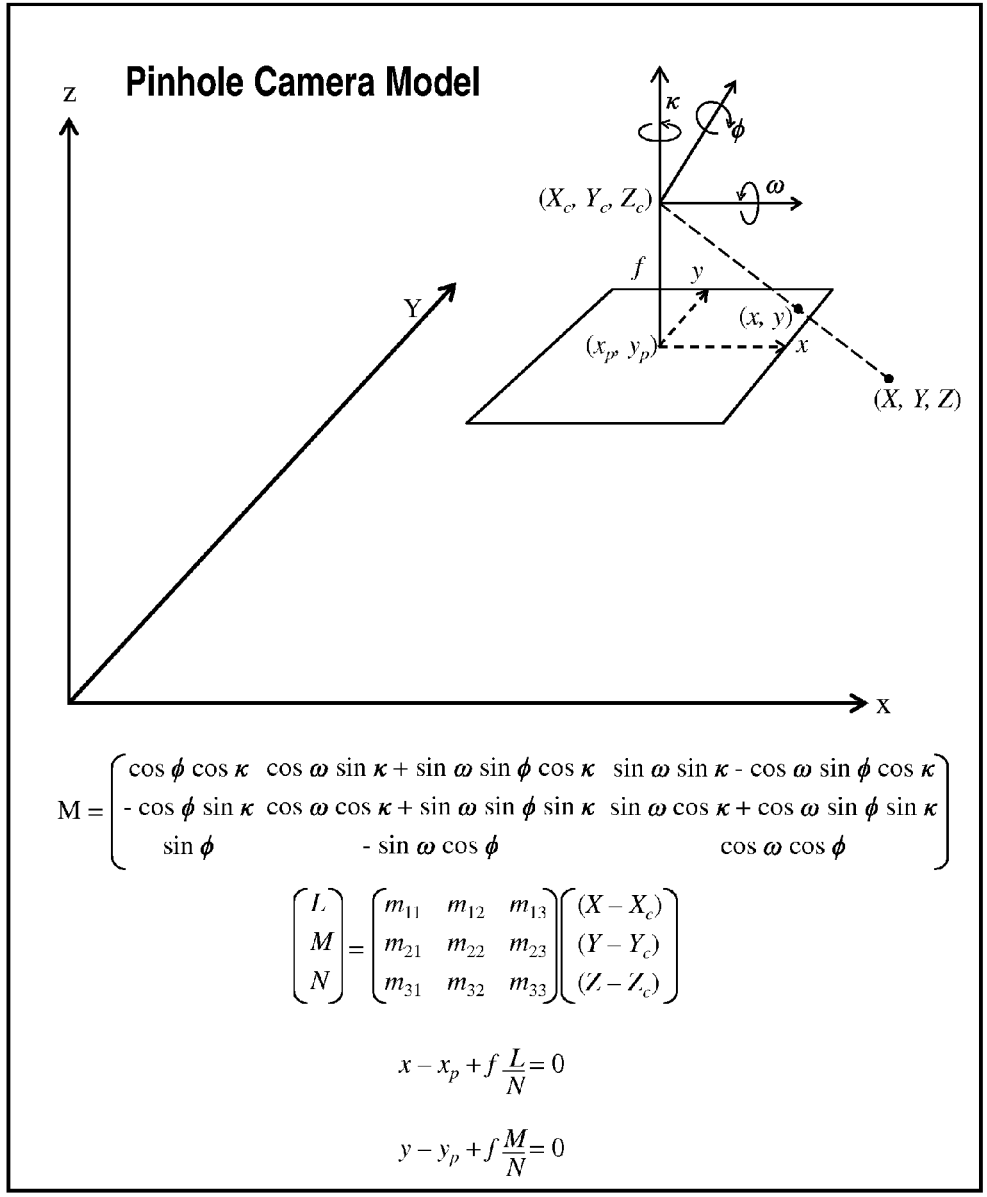
FIG. 4 is a schematic diagram of traditional pinhole camera projection equations.

FIG. 4 is a schematic diagram of traditional pinhole camera projection equations. Referring to FIG. 4, in some exemplary embodiments, the scan equations are derived by direct differentiation of the pinhole camera projection equations in FIG. 4 with respect to time. All the parameters of the pinhole camera model are allowed to vary with time except for the coordinates of the ground point of interest, camera focal length, and the camera principal point coordinates.

It is noted that the pinhole projection equations depicted in FIG. 4 assume that the position and attitude parameters are referenced to the central projection point. It will be understood that, in many systems of interest, the attitude measurements are made relative to coordinate axes that are rotated via fixed amounts relative to the formulation in FIG. 4. The fixed angles of this rotation are referred to as interlock angles. In addition, there is a fixed translation relative to the reference point for the position measurements. These effects are represented in a modified equation set as follows. The pinhole model equations in the special case that the perspective center is displaced and the attitude angles must be further rotated by interlock angles are given by:

$$\begin{pmatrix} x - x_p \\ y - y_p \\ -f \end{pmatrix} = \qquad\qquad \text{Eq. 1-1}$$

$$\frac{1}{\lambda} \begin{pmatrix} r_{11} & r_{12} & r_{13} \\ r_{21} & r_{22} & r_{23} \\ r_{31} & r_{32} & r_{33} \end{pmatrix} \begin{pmatrix} m_{11} & m_{12} & m_{13} \\ m_{21} & m_{22} & m_{23} \\ m_{31} & m_{32} & m_{33} \end{pmatrix} \begin{pmatrix} (X - X_c - X_0) \\ (Y - Y_c - Y_0) \\ (Z - Z_c - Z_0) \end{pmatrix}$$

Here, $\omega$, $\kappa$, $\phi$ represent the traditional roll, pitch, and yaw attitude angles, respectively. While $\bar\omega$, $\bar\kappa$, $\bar\phi$ represent the fixed interlock angles. Additionally, $X_0$, $Y_0$, $Z_0$ symbolize the fixed position translation components. Thus, the pinhole model becomes $$m_{11} = \cos\phi\cos\kappa \qquad\qquad \text{Eq. 1-2a}$$

$$m_{12} = \cos\omega\sin\kappa + \sin\omega\sin\phi\cos\kappa \qquad\qquad \text{Eq. 1-2b}$$

$$m_{13} = \sin\omega\sin\kappa - \cos\omega\sin\phi\cos\kappa \qquad\qquad \text{Eq. 1-2c}$$

$$m_{21} = -\cos\phi\sin\kappa \qquad\qquad \text{Eq. 1-2d}$$

$$m_{22} = \cos\omega\cos\kappa - \sin\omega\sin\phi\sin\kappa \qquad\qquad \text{Eq. 1-2e}$$

$$m_{23} = \sin\omega\cos\kappa + \cos\omega\sin\phi\sin\kappa \qquad\qquad \text{Eq. 1-2f}$$

$$m_{31} = \sin\phi \qquad\qquad \text{Eq. 1-2g}$$

$$m_{32} = -\sin\omega\cos\phi \qquad\qquad \text{Eq. 1-2h}$$

-continued $$m_{33} = \cos\omega\cos\phi \quad \text{Eq. 1-2i}$$

$$r_{11} = \cos\phi\cos\kappa \quad \text{Eq. 1-2j}$$

$$r_{12} = \cos\omega\sin\kappa + \sin\omega\sin\phi\cos\kappa \quad \text{Eq. 1-2k}$$

$$r_{13} = \sin\omega\sin\kappa - \cos\omega\sin\phi\cos\kappa \quad \text{Eq. 1-2l}$$

$$r_{21} = -\cos\phi\sin\kappa \quad \text{Eq. 1-2m}$$

$$r_{22} = \cos\omega\cos\kappa - \sin\omega\sin\phi\sin\kappa \quad \text{Eq. 1-2n}$$

$$r_{23} = \sin\omega\cos\kappa + \cos\omega\sin\phi\sin\kappa \quad \text{Eq. 1-2o}$$

$$r_{31} = \sin\phi \quad \text{Eq. 1-2p}$$

$$r_{32} = -\sin\omega\cos\phi \quad \text{Eq. 1-2q}$$

$$r_{33} = \cos\omega\cos\phi \quad \text{Eq. 1-2r}$$

$$\begin{pmatrix} \tilde{L} \\ \tilde{M} \\ \tilde{N} \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} m_{11} & m_{12} & m_{13} \\ m_{21} & m_{22} & m_{23} \\ m_{31} & m_{32} & m_{33} \end{pmatrix} \begin{pmatrix} (X - X_c - X_0) \\ (Y - Y_c - Y_0) \\ (Z - Z_c - Z_0) \end{pmatrix} \quad \text{Eq. 1-2s}$$

$$x - x_p + f\frac{\tilde{L}}{\tilde{N}} = 0 \quad \text{Eq. 1-2t}$$

$$y - y_p + f\frac{\tilde{M}}{\tilde{N}} = 0 \quad \text{Eq. 1-2u}$$

Thus, taking the derivative with respect to time of equations 1-2t and 1-2u yields $$\frac{dx}{dt} + \left(f\frac{\tilde{L}}{\tilde{N}}\right)\left[\frac{1}{\tilde{L}}\frac{d\tilde{L}}{dt} - \frac{1}{\tilde{N}}\frac{d\tilde{N}}{dt}\right] = 0 \quad \text{Eq. 1-3a}$$

$$\frac{dy}{dt} + \left(f\frac{\tilde{M}}{\tilde{N}}\right)\left[\frac{1}{\tilde{M}}\frac{d\tilde{M}}{dt} - \frac{1}{\tilde{N}}\frac{d\tilde{N}}{dt}\right] = 0 \quad \text{Eq. 1-3b}$$

Now observe that via equations 1-2t and 1-2u:

$$f\frac{\tilde{L}}{\tilde{N}} = x_p - x \quad \text{Eq. 1-4a}$$

$$f\frac{\tilde{M}}{\tilde{N}} = y_p - y \quad \text{Eq. 1-4b}$$

Substituting equation 1-4a into equation 1-3a yields:

$$\frac{dx}{dt} = x\left(\frac{1}{\tilde{L}}\frac{d\tilde{L}}{dt}\right) - x\left(\frac{1}{\tilde{N}}\frac{d\tilde{N}}{dt}\right) - x_p\left[\frac{1}{\tilde{L}}\frac{d\tilde{L}}{dt} - \frac{1}{\tilde{N}}\frac{d\tilde{N}}{dt}\right] \quad \text{Eq. 1-5}$$

Observe that equations 1-2t and 1-2u may be rewritten in the form:

$$\frac{x}{\tilde{L}} = \frac{y}{\tilde{M}} + \frac{x_p}{\tilde{L}} - \frac{y_p}{\tilde{M}} \quad \text{Eq. 1-6}$$

Substituting equation 1-6 into the first term on the right hand side of 1-5 and regrouping terms one finds:

$$\frac{dx}{dt} = x\left[\frac{-1}{\tilde{N}}\frac{d\tilde{N}}{dt}\right] + y\left(\frac{1}{\tilde{M}}\right)\left[\frac{d\tilde{L}}{dt}\right] + \left\{x_p\left[\frac{1}{\tilde{N}}\frac{d\tilde{N}}{dt}\right] - y_p\left(\frac{1}{\tilde{M}}\right)\left[\frac{d\tilde{L}}{dt}\right]\right\} \quad \text{Eq. 1-7}$$

Likewise, substituting 1-4b into 1-3b, and again employing 1-6 yields:

$$\frac{dy}{dt} = -\left(\frac{y}{\tilde{N}}\right)\frac{d\tilde{N}}{dt} + \left(\frac{x}{\tilde{L}}\right)\frac{d\tilde{M}}{dt} + \left\{y_p\left[\frac{1}{\tilde{N}}\frac{d\tilde{N}}{dt}\right] - \frac{x_p}{\tilde{L}}\frac{d\tilde{M}}{dt}\right\} \quad \text{Eq. 1-8}$$

Thus, the rates of change of the image coordinates across the focal plane (equations 1-7 and 1-8) assume the form of a coupled system of first order differential equations:

$$\frac{dx}{dt} = x\Gamma_1 + y\Gamma_2 + \Gamma_3 \quad \text{Eq. 1-9a}$$

$$\frac{dy}{dt} = x\Gamma_4 + y\Gamma_5 + \Gamma_6 \quad \text{Eq. 1-9b}$$

$$\Gamma_1 = \frac{-1}{\tilde{N}}\frac{d\tilde{N}}{dt} \quad \text{Eq. 1-9c}$$

$$\Gamma_2 = \frac{1}{\tilde{M}}\frac{d\tilde{L}}{dt} \quad \text{Eq. 1-9d}$$

$$\Gamma_3 = \left\{x_p\left[\frac{1}{\tilde{N}}\frac{d\tilde{N}}{dt}\right] - y_p\left(\frac{1}{\tilde{M}}\right)\left[\frac{d\tilde{L}}{dt}\right]\right\} = -x_p\Gamma_1 - y_p\Gamma_2 \quad \text{Eq. 1-9e}$$

$$\Gamma_4 = \frac{1}{\tilde{L}}\frac{d\tilde{M}}{dt} \quad \text{Eq. 1-9f}$$

$$\Gamma_5 = \Gamma_1 = \frac{-1}{\tilde{N}}\frac{d\tilde{N}}{dt} \quad \text{Eq. 1-9g}$$

$$\Gamma_6 = y_p\left[\frac{1}{\tilde{N}}\frac{d\tilde{N}}{dt}\right] - \frac{x_p}{\tilde{L}}\frac{d\tilde{M}}{dt} = -\Gamma_5 y_p - \Gamma_4 x_p \quad \text{Eq. 1-9h}$$

2. An Approximate Solution

This section describes a simplifying assumption that will enable one to solve equation 1-9 in closed form. This is accomplished by considering a time increment $\Delta t = \tau$ sufficiently small to ensure that one can accurately consider the computed coefficients $\Gamma_1, \ldots, \Gamma_6$ to be constant over this interval. One then solves the resulting equations and utilizes this solution until the time constraint has been reached. One then repeats the process until the entire image capture time has been covered in increments of $\Delta t = \tau$.

Observe that equations 1-9a through 1-9h can be written in matrix form as:

$$\frac{d}{dt}\vec{s}(t) = \Lambda_{2\times 2}\vec{s}(t) + \vec{F} \quad \text{Eq. 2-1a}$$

$$\vec{s}(t) = \begin{pmatrix} x(t) \\ y(t) \end{pmatrix} \quad \text{Eq. 2-1b}$$

$$\Lambda_{2\times 2} = \begin{pmatrix} \Gamma_1 & \Gamma_2 \\ \Gamma_4 & \Gamma_1 \end{pmatrix} \quad \text{Eq. 2-1c}$$

$$\vec{F} = \begin{pmatrix} \Gamma_3 \\ \Gamma_6 \end{pmatrix} \quad \text{Eq. 2-1d}$$

Note that the scan coefficients $\Gamma_1, \ldots \Gamma_6$ depend on the set of platform support parameters.

There are numerous mathematical techniques for solving such a system including: matrix methods, the Laplace transform, method of elimination, etc. Employing matrix methods, one can show that the solution to equation 2-1 is:

$$\vec{s}(t) = e^{\Lambda(t-t_0)}\vec{s}(t_0) + \int_{t_0}^{t} e^{\Lambda(t-\zeta)}\vec{F}d\zeta \qquad \text{Eq. 2-2}$$

Note that the function $e^{A(t-t_0)}$ yields a matrix upon evaluation, which in linear systems theory is referred to as the state transition matrix. One can represent this function of a matrix in series form as:

$$e^{\Lambda t} = \sum_{p=0}^{\infty} \frac{\Lambda^p t^p}{p!} \qquad \text{Eq. 2-3}$$

As the exponential is an entire function in the complex plane, then the series in equation 2-3 converges for all complex 2×2 matrices.

Evaluation of the exponential function of the matrix $\Lambda$ may be accomplished in closed form by employing the spectral resolution theorem:

Spectral Resolution Theorem:

If A is a member of the set of n×n complex matrices, $f$ is a function defined on the spectrum of A, $f_k^{(j)}$ is the value of the jth derivative of $f$ at the eigenvalue $\lambda_k$ ($k=1, 2 \ldots, s, j=0, \ldots m_k-1$), and $m_k$ is the index of $\lambda_k$, then there exists matrices $Z_{kj}$, independent of $f$, such that:

$$F(A) = \sum_{k=1}^{s} \sum_{j=1}^{m_k} f_k^{(j-1)} Z_{kj} \qquad \text{Eq. 2-4}$$

Moreover, the matrices $Z_{kj}$ are linearly independent n×n complex matrices and commute with A. Recall that the index $m_k$ of an eigenvalue $\lambda_k$ of the matrix $\Lambda$ is the power of the term $(\lambda-\lambda_k)^{m_k}$ appearing in the minimal annihilating polynomial of $\Lambda$.

Successful application of this theorem requires that one first:

Determine the eigenvalues of the matrix $\Lambda$.
Compute the matrices $Z_{kj}$.

The eigenvalues are determined via the characteristic equation:

$$\det\left|\begin{pmatrix} \Gamma_1-\lambda & \Gamma_2 \\ \Gamma_4 & \Gamma_1-\lambda \end{pmatrix}\right| = 0 \qquad \text{Eq. 2-5}$$

The resulting characteristic equation is quadratic:

$$\lambda^2 - 2\Gamma_1\lambda + (\Gamma_1^2 - \Gamma_2\Gamma_4) = 0$$

One finds the eigenvalues to be:

$$\lambda_1 = \Gamma_1 + \sqrt{\Gamma_2\Gamma_4} \qquad \text{Eq. 2-6a}$$

$$\lambda_2 = \Gamma_1 - \sqrt{\Gamma_2\Gamma_4} \qquad \text{Eq. 2-6b}$$

This results in three distinct cases depending on the sign of the discriminant D:

$$D = \Gamma_2\Gamma_4 \qquad \text{Eq. 2-7}$$

Case 1: D>0 Two distinct real eigenvalues
Case 2: D<0 Two distinct complex conjugate eigenvalues
Case 3: D=0 One repeated real eigenvalue The spectral resolution of the function $e^{\Lambda t}$ is known for each of these cases:

Case 1: D>0 Two Distinct Real Eigenvalues $$e^{\Lambda(t-t_0)} = \frac{e^{\alpha(t-t_0)}}{\beta}\begin{pmatrix} \beta\cosh(\beta(t-t_0)) & \Gamma_2\sinh(\beta(t-t_0)) \\ \Gamma_4\sinh(\beta(t-t_0)) & \beta\cosh(\beta(t-t_0)) \end{pmatrix} \qquad \text{Eq. 2-8a}$$

$$\alpha = \Gamma_1 \qquad \text{Eq. 2-8b}$$

$$\beta = \sqrt{\Gamma_2\Gamma_4} \qquad \text{Eq. 2-8c}$$

Case 2: D<0 Two Distinct Complex Conjugate Eigenvalues $$e^{\Lambda(t-t_0)} = \frac{e^{\alpha(t-t_0)}}{\tilde{\beta}}\begin{pmatrix} \tilde{\beta}\cos(\tilde{\beta}(t-t_0)) & \Gamma_2\sin(\tilde{\beta}(t-t_0)) \\ \Gamma_4\sin(\tilde{\beta}(t-t_0)) & \tilde{\beta}\cos(\tilde{\beta}(t-t_0)) \end{pmatrix} \qquad \text{Eq. 2-9a}$$

$$\tilde{\beta} = \sqrt{-\Gamma_2\Gamma_4} \qquad \text{Eq. 2-9b}$$

Case 3: D=0 One Repeated Real Eigenvalue $$e^{\Lambda(t-t_0)} = e^{\alpha(t-t_0)}\begin{pmatrix} 1 & \Gamma_2(t-t_0) \\ \Gamma_4(t-t_0) & 1 \end{pmatrix} \qquad \text{Eq. 2-10}$$

The solution expressed in equation 2-2 may now be computed for each case.

Case 1: D>0 Two Distinct Real Eigenvalues $$\vec{s}(t) = \frac{e^{\alpha(t-t_0)}}{\beta}\begin{pmatrix} \beta\cosh(\beta(t-t_0)) & \Gamma_2\sinh(\beta(t-t_0)) \\ \Gamma_4\sinh(\beta(t-t_0)) & \beta\cosh(\beta(t-t_0)) \end{pmatrix}\vec{s}(t_0) + \int_{t_0}^{t} \frac{e^{\alpha(t-\varsigma)}}{\beta}\begin{pmatrix} \beta\cosh(\beta(t-\varsigma)) & \Gamma_2\sinh(\beta(t-\varsigma)) \\ \Gamma_4\sinh(\beta(t-\varsigma)) & \beta\cosh(\beta(t-\varsigma)) \end{pmatrix}\vec{F}d\varsigma \qquad \text{Eq. 2-11}$$

Hence, expanding terms $$\vec{s}(t) = \frac{e^{\alpha(t-t_0)}}{\beta}\begin{pmatrix} [\beta\cosh(\beta(t-t_0))]x_0 + [\Gamma_2\sinh(\beta(t-t_0))]y_0 \\ [\Gamma_4\sinh(\beta(t-t_0))]x_0 + [\beta\cosh(\beta(t-t_0))]y_0 \end{pmatrix} + \int_{t_0}^{t}\left(\frac{e^{\alpha(t-\varsigma)}}{\beta}\right)\begin{pmatrix} [\beta\cosh(\beta(t-\varsigma))]\Gamma_3 + [\Gamma_2\sinh(\beta(t-\varsigma))]\Gamma_6 \\ [\Gamma_4\sinh(\beta(t-\varsigma))]\Gamma_3 + [\beta\cosh(\beta(t-\varsigma))]\Gamma_6 \end{pmatrix}d\varsigma \qquad \text{Eq. 2-12}$$

Observe that one may rewrite the integral in equation 2-12 to obtain:

$$\vec{s}(t) = \frac{e^{\alpha(t-t_0)}}{\beta}\begin{pmatrix} [\beta\cosh(\beta(t-t_0))]x_0 + [\Gamma_2\sinh(\beta(t-t_0))]y_0 \\ [\Gamma_4\sinh(\beta(t-t_0))]x_0 + [\beta\cosh(\beta(t-t_0))]y_0 \end{pmatrix} + \int_{0}^{t-t_0}\left(\frac{e^{\alpha z}}{\beta}\right)\begin{pmatrix} [\beta\Gamma_3\cosh(\beta z)] + [(\Gamma_2\Gamma_6)\sinh(\beta z)] \\ [\beta\Gamma_6\cosh(\beta z)] + [(\Gamma_4\Gamma_3)\sinh(\beta z)] \end{pmatrix}dz \qquad \text{Eq. 2-13}$$

Direct integration establishes that:

$$\int e^{\alpha z}\cosh(\beta z)dz = \tag{Eq. 2-14a}$$

$$\frac{1}{2}\int e^{(\alpha+\beta)z}dz + \frac{1}{2}\int e^{(\alpha-\beta)z}dz = \frac{e^{(\alpha+\beta)z}}{2(\alpha+\beta)} + \frac{e^{(\alpha-\beta)z}}{2(\alpha-\beta)}$$

$$\int e^{\alpha z}\sinh(\beta z)dz = \tag{Eq. 2-14b}$$

$$\frac{1}{2}\int e^{(\alpha+\beta)z}dz - \frac{1}{2}\int e^{(\alpha-\beta)z}dz = \frac{e^{(\alpha+\beta)z}}{2(\alpha+\beta)} - \frac{e^{(\alpha-\beta)z}}{2(\alpha-\beta)}$$

Substituting equations 2-14a and 2-14b into 2-13 yields:

$$\vec{s}(t) = \frac{e^{\alpha(t-t_0)}}{\beta}\begin{pmatrix} [\beta\cosh(\beta(t-t_0))]x_0 + [\Gamma_2\sinh(\beta(t-t_0))]y_0 \\ [\Gamma_4\sinh(\beta(t-t_0))]x_0 + [\beta\cosh(\beta(t-t_0))]y_0 \end{pmatrix} + \tag{Eq. 2-15}$$

$$\begin{pmatrix} \Gamma_3\left[\frac{e^{(\alpha+\beta)z}}{2(\alpha+\beta)} + \frac{e^{(\alpha-\beta)z}}{2(\alpha-\beta)}\right]_0^{t-t_0} + \frac{(\Gamma_2\Gamma_6)}{\beta}\left[\frac{e^{(\alpha+\beta)z}}{2(\alpha+\beta)} - \frac{e^{(\alpha-\beta)z}}{2(\alpha-\beta)}\right]_0^{t-t_0} \\ \Gamma_6\left[\frac{e^{(\alpha+\beta)z}}{2(\alpha+\beta)} + \frac{e^{(\alpha-\beta)z}}{2(\alpha-\beta)}\right]_0^{t-t_0} + \frac{(\Gamma_4\Gamma_3)}{\beta}\left[\frac{e^{(\alpha+\beta)z}}{2(\alpha+\beta)} - \frac{e^{(\alpha-\beta)z}}{2(\alpha-\beta)}\right]_0^{t-t_0} \end{pmatrix}$$

Consequently, the solution to Case 1 (D>0 two distinct real eigenvalues) is:

$$\vec{s}(t) = \frac{e^{\alpha(t-t_0)}}{\beta}\begin{pmatrix} [\beta\cosh(\beta(t-t_0))]x_0 + [\Gamma_2\sinh(\beta(t-t_0))]y_0 \\ [\Gamma_4\sinh(\beta(t-t_0))]x_0 + [\beta\cosh(\beta(t-t_0))]y_0 \end{pmatrix} + \tag{Eq. 2-16}$$

$$\begin{pmatrix} \Gamma_3\left[\frac{e^{(\alpha+\beta)(t-t_0)}}{2(\alpha+\beta)} + \frac{e^{(\alpha-\beta)(t-t_0)}}{2(\alpha-\beta)}\right] + \frac{(\Gamma_2\Gamma_6)}{\beta}\left[\frac{e^{(\alpha+\beta)z}}{2(\alpha+\beta)} - \frac{e^{(\alpha-\beta)z}}{2(\alpha-\beta)}\right] - \\ \frac{\Gamma_3}{2}\left[\frac{1}{(\alpha+\beta)} + \frac{1}{(\alpha-\beta)}\right] - \frac{(\Gamma_2\Gamma_6)}{2\beta}\left[\frac{1}{(\alpha+\beta)} + \frac{1}{(\alpha-\beta)}\right] \\ \Gamma_6\left[\frac{e^{(\alpha+\beta)(t-t_0)}}{2(\alpha+\beta)} + \frac{e^{(\alpha-\beta)(t-t_0)}}{2(\alpha-\beta)}\right] + \frac{(\Gamma_4\Gamma_3)}{\beta}\left[\frac{e^{(\alpha+\beta)(t-t_0)}}{2(\alpha+\beta)} - \frac{e^{(\alpha-\beta)(t-t_0)}}{2(\alpha-\beta)}\right] - \\ \frac{\Gamma_6}{2}\left[\frac{1}{(\alpha+\beta)} + \frac{1}{(\alpha-\beta)}\right] - \frac{(\Gamma_4\Gamma_3)}{2\beta}\left[\frac{1}{(\alpha+\beta)} + \frac{1}{(\alpha-\beta)}\right] \end{pmatrix}$$

Case 2: D<0 Two Distinct Complex Conjugate Eigenvalues
One may write immediately via analogy with equation 2-13:

$$\vec{s}(t) = \frac{e^{\alpha(t-t_0)}}{\tilde{\beta}}\begin{pmatrix} [\tilde{\beta}\cos(\tilde{\beta}(t-t_0))]x_0 + [\Gamma_2\sin(\tilde{\beta}(t-t_0))]y_0 \\ [\Gamma_4\sin(\tilde{\beta}(t-t_0))]x_0 + [\tilde{\beta}\cos(\tilde{\beta}(t-t_0))]y_0 \end{pmatrix} + \tag{Eq. 2-17}$$

$$\int_0^{t-t_0}\left(\frac{e^{\alpha z}}{\tilde{\beta}}\right)\begin{pmatrix} [\tilde{\beta}\Gamma_3\cos(\tilde{\beta}z)] + [(\Gamma_2\Gamma_6)\sin(\tilde{\beta}z)] \\ [\tilde{\beta}\Gamma_6\cos(\tilde{\beta}z)] + [(\Gamma_4\Gamma_3)\sin(\tilde{\beta}z)] \end{pmatrix}dz$$

One can show that $$\int e^{\alpha z}\cos(\tilde{\beta}z)dz = \frac{e^{\alpha z}(\alpha\cos(\tilde{\beta}z) + \tilde{\beta}\sin(\tilde{\beta}z))}{\alpha^2 + \tilde{\beta}^2} \tag{Eq. 2-18a}$$

$$\int e^{\alpha z}\sin(\tilde{\beta}z)dz = \frac{e^{\alpha z}(\alpha\sin(\tilde{\beta}z) - \tilde{\beta}\cos(\tilde{\beta}z))}{\alpha^2 + \tilde{\beta}^2} \tag{Eq. 2-18b}$$

Substituting equations 2-18a and 2-18b into 2-17 yields:

$$\vec{s}(t) = \frac{e^{\alpha(t-t_0)}}{\tilde{\beta}}\begin{pmatrix} [\tilde{\beta}\cos(\tilde{\beta}(t-t_0))]x_0 + [\Gamma_2\sin(\tilde{\beta}(t-t_0))]y_0 \\ [\Gamma_4\sin(\tilde{\beta}(t-t_0))]x_0 + [\tilde{\beta}\cos(\tilde{\beta}(t-t_0))]y_0 \end{pmatrix} + \tag{Eq. 2-19}$$

$$\begin{pmatrix} \Gamma_3\left[\frac{e^{\alpha z}(\alpha\cos(\tilde{\beta}z) + \tilde{\beta}\sin(\tilde{\beta}z))}{\alpha^2 + \tilde{\beta}^2}\right]_0^{t-t_0} + \\ \frac{(\Gamma_2\Gamma_6)}{\tilde{\beta}}\left[\frac{e^{\alpha z}(\alpha\sin(\tilde{\beta}z) - \tilde{\beta}\cos(\tilde{\beta}z))}{\alpha^2 + \tilde{\beta}^2}\right]_0^{t-t_0} \\ \Gamma_6\left[\frac{e^{\alpha z}(\alpha\cos(\tilde{\beta}z) + \tilde{\beta}\sin(\tilde{\beta}z))}{\alpha^2 + \tilde{\beta}^2}\right]_0^{t-t_0} + \\ \frac{(\Gamma_4\Gamma_3)}{\tilde{\beta}}\left[\frac{e^{\alpha z}(\alpha\sin(\tilde{\beta}z) - \tilde{\beta}\cos(\tilde{\beta}z))}{\alpha^2 + \tilde{\beta}^2}\right]_0^{t-t_0} \end{pmatrix}$$

Hence, one finds the solution for Case 2 (D<0 Two distinct complex conjugate eigenvalues) to be:

$$\vec{s}(t) = \frac{e^{\alpha(t-t_0)}}{\tilde{\beta}}\begin{pmatrix} [\tilde{\beta}\cos(\tilde{\beta}(t-t_0))]x_0 + [\Gamma_2\sin(\tilde{\beta}(t-t_0))]y_0 \\ [\Gamma_4\sin(\tilde{\beta}(t-t_0))]x_0 + [\tilde{\beta}\cos(\tilde{\beta}(t-t_0))]y_0 \end{pmatrix} + \tag{Eq. 2-20}$$

$$\begin{pmatrix} \Gamma_3\left[\frac{e^{\alpha z}(\alpha\cos(\tilde{\beta}(t-t_0)) + \tilde{\beta}\sin(\tilde{\beta}(t-t_0)))}{\alpha^2 + \tilde{\beta}^2}\right] + \frac{(\Gamma_2\Gamma_6)}{\tilde{\beta}} \\ \left[\frac{e^{\alpha z}(\alpha\sin(\tilde{\beta}(t-t_0)) - \tilde{\beta}\cos(\tilde{\beta}(t-t_0)))}{\alpha^2 + \tilde{\beta}^2}\right] - \frac{\Gamma_3\alpha}{\alpha^2 + \tilde{\beta}^2} + \frac{(\Gamma_2\Gamma_6)}{(\alpha^2 + \tilde{\beta}^2)} \\ \Gamma_6\left[\frac{e^{\alpha z}(\alpha\cos(\tilde{\beta}(t-t_0)) + \tilde{\beta}\sin(\tilde{\beta}(t-t_0)))}{\alpha^2 + \tilde{\beta}^2}\right] + \frac{(\Gamma_4\Gamma_3)}{\tilde{\beta}} \\ \left[\frac{e^{\alpha z}(\alpha\sin(\tilde{\beta}(t-t_0)) - \tilde{\beta}\cos(\tilde{\beta}(t-t_0)))}{\alpha^2 + \tilde{\beta}^2}\right] - \frac{\Gamma_6\alpha}{\alpha^2 + \tilde{\beta}^2} + \frac{(\Gamma_4\Gamma_3)}{(\alpha^2 + \tilde{\beta}^2)} \end{pmatrix}$$

Case 3: D=0 One Repeated Real Eigenvalue
Substituting equation 2-10 into 2-2 yields $$\vec{s}(t) = e^{\alpha(t-t_0)}\begin{pmatrix} 1 & \Gamma_2(t-t_0) \\ \Gamma_4(t-t_0) & 1 \end{pmatrix}\vec{s}(t_0) + \tag{Eq. 2-21}$$

$$\int_{t_0}^t e^{\alpha(t-\varsigma)}\begin{pmatrix} 1 & \Gamma_2(t-\varsigma) \\ \Gamma_4(t-\varsigma) & 1 \end{pmatrix}\vec{F}\,d\varsigma$$

Hence, one may write that;

$$\vec{s}(t) = \tag{Eq. 2-22}$$

$$e^{\alpha(t-t_0)}\begin{pmatrix} x_0 + \Gamma_2(t-t_0)y_0 \\ \Gamma_4(t-t_0)x_0 + y_0 \end{pmatrix} + \int_{t_0}^t e^{\alpha(t-\varsigma)}\begin{pmatrix} \Gamma_3 + \Gamma_6\Gamma_2(t-\varsigma) \\ \Gamma_3\Gamma_4(t-\varsigma) + \Gamma_6 \end{pmatrix}d\varsigma$$

A simple change of variables yields;

$$\vec{s}(t) = e^{\alpha(t-t_0)}\begin{pmatrix} x_0 + \Gamma_2(t-t_0)y_0 \\ \Gamma_4(t-t_0)x_0 + y_0 \end{pmatrix} + \int_0^{t-t_0} e^{\alpha z}\begin{pmatrix} \Gamma_3 + \Gamma_6\Gamma_2 z \\ \Gamma_3\Gamma_4 z + \Gamma_6 \end{pmatrix}dz \qquad \text{Eq. 2-23}$$

Consequently, $$\vec{s}(t) = \qquad \text{Eq. 2-24}$$
$$e^{\alpha(t-t_0)}\begin{pmatrix} x_0 + \Gamma_2(t-t_0)y_0 \\ \Gamma_4(t-t_0)x_0 + y_0 \end{pmatrix} + \int_0^{t-t_0} e^{\alpha z}\begin{pmatrix} (\Gamma_3 + [\Gamma_6\Gamma_2]z) \\ (\Gamma_6 + [\Gamma_3\Gamma_4]z) \end{pmatrix}dz$$

Integrating by parts yields that $$\int e^{\alpha z}[\Gamma_6\Gamma_2]z = [\Gamma_6\Gamma_2]\left(\frac{\alpha z - 1}{\alpha^2}\right)e^{\alpha z} \qquad \text{Eq. 2-25a}$$

$$\int e^{\alpha z}[\Gamma_3\Gamma_4]z = [\Gamma_3\Gamma_4]\left(\frac{\alpha z - 1}{\alpha^2}\right)e^{\alpha z} \qquad \text{Eq. 2-25b}$$

Substituting equations 2-25a and 2-25b into 2-24 yields the solution to Case 3 (D=0 One repeated real eigenvalue):

$$\vec{s}(t) = e^{\alpha(t-t_0)}\begin{pmatrix} x_0 + \Gamma_2(t-t_0)y_0 \\ \Gamma_4(t-t_0)x_0 + y_0 \end{pmatrix} + \qquad \text{Eq. 2-26}$$
$$\begin{pmatrix} \left(\left(\frac{\Gamma_3}{\alpha} + [\Gamma_6\Gamma_2]\right)\left(\frac{\alpha(t-t_0)-1}{\alpha^2}\right)\right)e^{\alpha(t-t_0)} + \left(-\frac{\Gamma_3}{\alpha} + \left(\frac{[\Gamma_6\Gamma_2]}{\alpha^2}\right)\right) \\ \left(\left(\frac{\Gamma_6}{\alpha} + [\Gamma_3\Gamma_4]\right)\left(\frac{\alpha(t-t_0)-1}{\alpha^2}\right)\right)e^{\alpha(t-t_0)} + \left(-\frac{\Gamma_6}{\alpha} + \left(\frac{[\Gamma_3\Gamma_4]}{\alpha^2}\right)\right) \end{pmatrix}$$

One should note that the constant scan coefficients employed in the approximate solution presented here depend on the coordinates X, Y, Z of the ground target point. For each solution one must choose a set of ground coordinates to be used in computing $\Gamma_1, \ldots \Gamma_6$. In the case where one wishes to specify a point in the focal plane instead; one may employ the non-pinhole camera projection equations to establish where that point intersects the earth's surface (usually accomplished via iteration). The resulting ground coordinates may then be employed to compute the scan coefficients used in the solution.

3. Error Propagation Model and MRC

Figure 5:
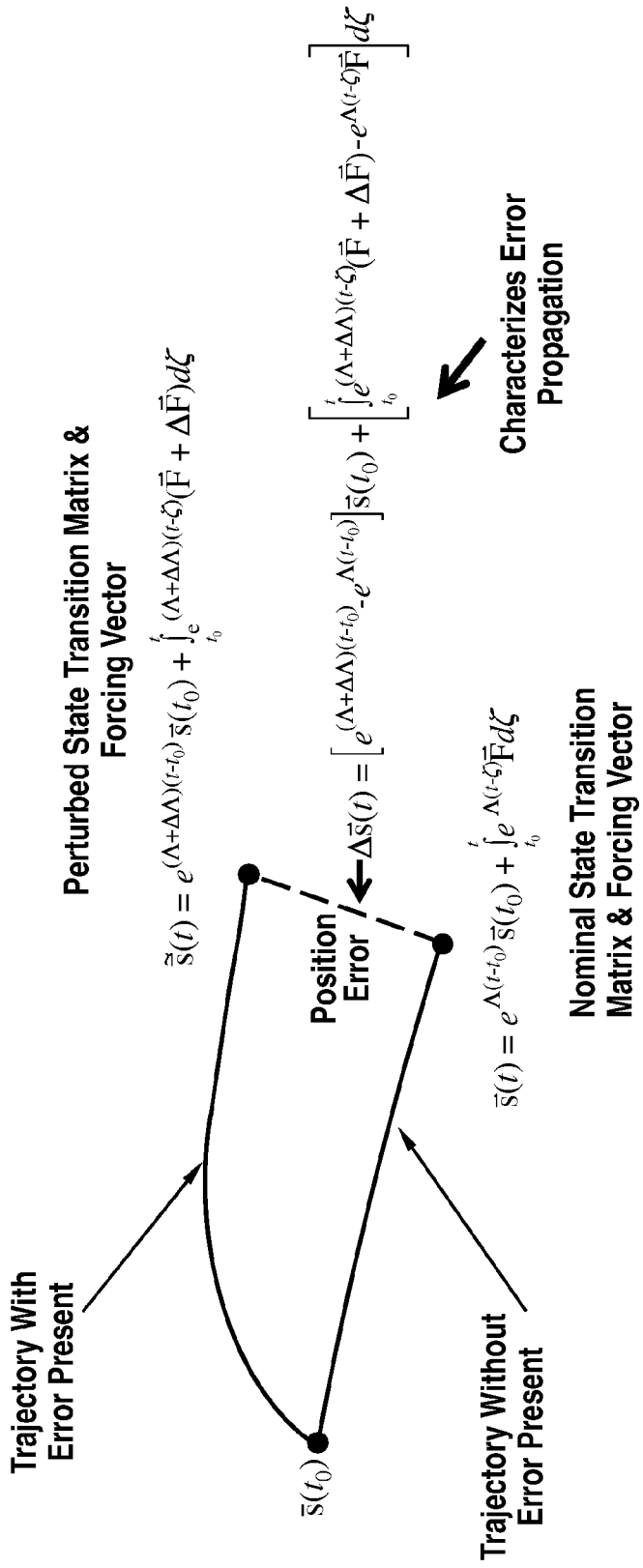
FIG. 5 is a schematic diagram of an error perturbation model, according to some exemplary embodiments.

The solution to the image scan equations is propagated in time via the state transition matrix and the forcing vector. As the scan coefficients completely determine the state transition matrix and forcing vector, any errors in image motion propagation arise from errors in the scan coefficients (within the accuracy of the constant scan coefficients assumption). Thus, the error propagation model can be constructed as indicated in FIG. 5, which is a schematic diagram of an error perturbation model, according to some exemplary embodiments. FIG. 5 illustrates a state at time $t_0$ and two possible positions at some time t after $t_0$. One of the positions is defined by the nominal state transition matrix and forcing vector provided in FIG. 5, and the other position is defined by a perturbed state transition matrix and forcing vector, also provided in FIG. 5. The difference in position between the two points is the position error, which is defined by the fundamental error propagation equation, also provided in FIG. 5 and reproduced below as Eq. 3-1a.

Thus the fundamental error propagation equation is:

$$\Delta\vec{s}(t) = [e^{(\Lambda+\Delta\Lambda)(t-t_0)} - e^{\Lambda(t-t_0)}]\vec{s}(t_0) + \qquad \text{Eq. 3-1a}$$
$$\left[\int_{t_0}^t e^{(\Lambda+\Delta\Lambda)(t-\zeta)}(\vec{F} + \Delta\vec{F}) - e^{\Lambda(t-\zeta)}\vec{F}\right]d\zeta$$

$$\Delta\Lambda = \begin{pmatrix} \Delta\Gamma_1 & \Delta\Gamma_2 \\ \Delta\Gamma_4 & \Delta\Gamma_5 \end{pmatrix} \qquad \text{Eq. 3-1b}$$

$$\Delta\vec{F} = \begin{pmatrix} \Delta\Gamma_3 \\ \Delta\Gamma_6 \end{pmatrix} \qquad \text{Eq. 3-1c}$$

Here $\Delta\vec{s}(t)$ the total error in the focal plane coordinates arising from propagating forward, from the initial conditions $\vec{s}(t_0)$, in time by $(t-t_0)$ in the presence of scan coefficient errors $\Delta\Gamma_1, \ldots \Delta\Gamma_6$. It is noted that this approach does not require the individual estimation of linear, oscillatory and random errors, as was the case with the previous approaches.

According to the exemplary embodiments, $1^{st}$-order error propagation model is constructed by expanding the indicated state transition matrices in equation 3-1a in time, and retaining only the first-order terms:

$$e^{(\Lambda+\Delta\Lambda)t} = \sum_{p=0}^{\infty} \frac{(\Lambda+\Delta\Lambda)^p t^p}{p!} \approx I + (\Lambda+\Delta\Lambda)(t-t_0) \qquad \text{Eq. 3-2a}$$

$$e^{\Lambda(t-t_0)} = \sum_{p=0}^{\infty} \frac{(\Lambda)^p (t-t_0)^p}{p!} \approx I + \Lambda(t-t_0) \qquad \text{Eq. 3-2b}$$

Substituting equations 3-2a and 3-2b into 3-1 and retaining only first-order terms in the scan coefficient errors $\Delta\Gamma_1, \ldots, \Delta\Gamma_6$ yields:

$$\Delta\vec{s}(t) = [\Delta\Lambda(t-t_0)]\vec{s}(t_0) + [\Delta\vec{F}(t-t_0)] + \qquad \text{Eq. 3-3}$$
$$\frac{1}{2}[(\Delta\Lambda)\vec{F} + \Lambda(\Delta\vec{F})](t-t_0)^2$$

One observes from equation 3-3 that the focal plane coordinate errors vary with propagation time. The longer the propagation time, the larger the resulting focal plane errors will be. This trend has significant practical impacts for line scanning sensors with slow line rates, or where the separation between the leading and trailing detector arrays 12, 16 is large.

Thus, according to the disclosure, an equation has been derived that predicts focal plane coordinate errors in terms of propagation time and scan coefficient errors. This equation is most useful if one has knowledge of the scan coefficient errors. The detector junction measurements can be utilized to derive the desired scan coefficients errors. Specifically, equation 3-3 is rewritten to establish a measurement sensitivity matrix, which relates the errors in the scan coefficients to the detector-junction-measured coordinate differences (between the predicted and correlation-determined positions).

Equation 3-3 is expanded in terms of the individual scan coefficient errors $\Delta\Gamma_1, \ldots, \Delta\Gamma_6$, and terms are rearranged to obtain:

$$\Delta \vec{s}(t) = \qquad \text{Eq. 3-4a}$$

$$H_{2\times6}\Delta\vec{\Gamma}_{6\times1} = \begin{pmatrix} H_{11} & H_{12} & H_{13} & H_{14} & H_{15} & H_{16} \\ H_{21} & H_{22} & H_{23} & H_{24} & H_{25} & H_{26} \end{pmatrix} \begin{pmatrix} \Delta\Gamma_1 \\ \Delta\Gamma_2 \\ \Delta\Gamma_3 \\ \Delta\Gamma_4 \\ \Delta\Gamma_5 \\ \Delta\Gamma_6 \end{pmatrix}$$

$$H_{11} = \left[ x_0(t - t_0) + \Gamma_1 \frac{(t-t_0)^2}{2} \right] \qquad \text{Eq. 3-4b}$$

$$H_{12} = y_0(t - t_0) + \frac{\Gamma_6}{2}(t - t_0)^2 \qquad \text{Eq. 3-4c}$$

$$H_{13} = (t - t_0) + \frac{\Gamma_1}{2}(t - t_0)^2 \qquad \text{Eq. 3-4d}$$

$$H_{14} = 0 \qquad \text{Eq. 3-4e}$$

$$H_{15} = 0 \qquad \text{Eq. 3-4f}$$

$$H_{16} = \Gamma_2 \frac{(t-t_0)^2}{2} \qquad \text{Eq. 3-4g}$$

$$H_{21} = 0 \qquad \text{Eq. 3-4h}$$

$$H_{22} = 0 \qquad \text{Eq. 3-4i}$$

$$H_{23} = \frac{\Gamma_4}{2}(t - t_0)^2 \qquad \text{Eq. 3-4j}$$

$$H_{24} = x_0(t - t_0) + \Gamma_3 \frac{(t-t_0)^2}{2} \qquad \text{Eq. 3-4k}$$

$$H_{25} = y_0(t - t_0) + \Gamma_6 \frac{(t-t_0)^2}{2} \qquad \text{Eq. 3-4l}$$

$$H_{26} = (t - t_0) + \Gamma_5 \frac{(t-t_0)^2}{2} \qquad \text{Eq. 3-4m}$$

At this point, one assumes the scan coefficient errors to be constant across an image line, and then employs equations 3-4a through 3-4m to execute a least squares estimate of these scan errors given sufficient detector junction measurements $\Delta \vec{s}_j(t_0)$ j=1 ... m to over determine the system. It is noted that only the initial condition $\vec{s}_j(t_0)$ j=1, ..., m and the scan coefficients $\Gamma_{1j}, ..., \Gamma_{6j}$ j=1 ..., m vary from detector junction to junction. Thus the least squares solution becomes:

$$\Delta\vec{\Gamma}_{6\times1} = (H^T_{6\times2m} H_{2m\times6})^{-1} H^T_{6\times2m} \begin{pmatrix} \Delta\vec{s}_1(t) \\ \vdots \\ \Delta\vec{s}_m(t) \end{pmatrix}_{2m\times1} \qquad \text{Eq. 3-5a}$$

$$\Delta\vec{s}_j(t) = \begin{pmatrix} \Delta x_j \\ \Delta y_j \end{pmatrix} \qquad \text{Eq. 3-5b}$$

It is noted that equation 3-5a is only valid when the indicated matrix inversion exists. In the event that the matrix is not invertible for a particular line, this line would have its total motion error correction by interpolating the closest lines that yielded successful solutions.

Figure 6:
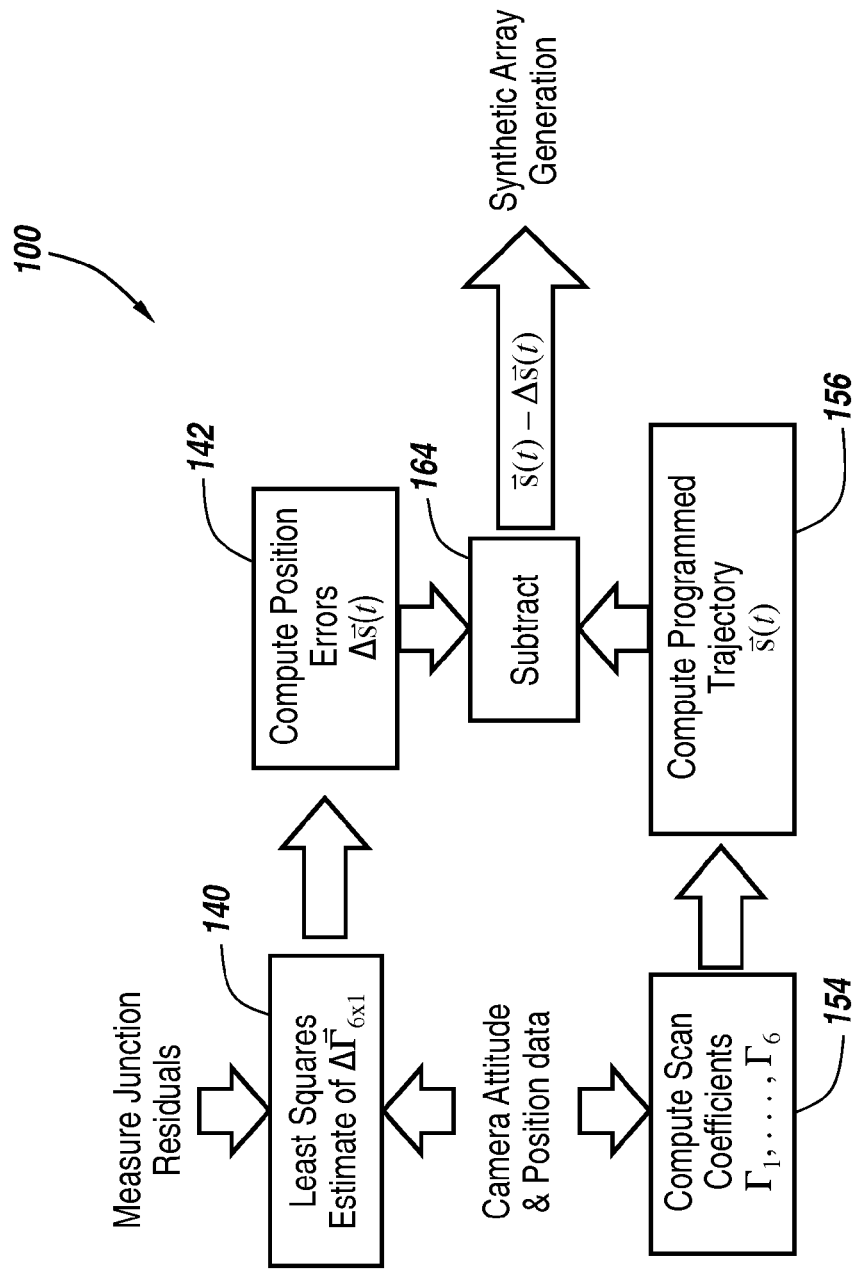
FIG. 6 includes a schematic block diagram of an MRC process, according to some exemplary embodiments.

FIG. 6 includes a schematic block diagram of the MRC process described in detail in the foregoing. Given the estimate of the scan coefficient errors on a line-by-line basis, the MRC correction process of the disclosure can be implemented as depicted in FIG. 6. According to the process, total motion error is removed prior to synthetic array generation.

Referring to FIG. 6, a least squares estimate of $\Delta\vec{\Gamma}_{6\times1}$ at 140, is computed using camera attitude and position data and measured junction residuals. Using the least squares estimate, position errors are computed at 142. Scan coefficients are computed at 154, also using the camera attitude and position data. The programmed trajectory is computed at 156 using the computed scan coefficients. The position errors computed at 142 are subtracted at 164 from the programmed trajectory computed in 156 to generate the synthetic array.

4. Covariance Error Model

According to the exemplary embodiments, an error model has been developed that relates a given set of scan coefficient errors to the resulting focal plane coordinate errors. Considering the scan coefficient errors to be random variables with a known joint probability distribution, expressions for the mean and covariance of the resulting focal plane coordinate errors are obtained. These expressions are referred to herein as the covariance model.

Define the expectation operation $\langle \ \rangle$ with respect to the joint probability distribution $p(\Delta\Gamma_1, \ldots, \Delta\Gamma_6)$ via:

$$\langle f(\Delta\Gamma_1, \ldots, \Delta\Gamma_6) \rangle = \iiint f(\Delta\Gamma_1, \ldots, \Delta\Gamma_6) p(\Delta\Gamma_1, \ldots, \Delta\Gamma_6) d(\Delta\Gamma_1) \ldots d(\Delta\Gamma_6) \qquad \text{Eq. 4-1}$$

This expectation operator will now be employed to compute the desired mean and covariance of the focal plane coordinate errors. Hence applying the expectation operator to equation 3-4a yields the mean error $\langle \Delta\vec{s}(t) \rangle$ to be:

$$\langle \Delta\vec{s}(t) \rangle = H_{2\times6} \langle \Delta\vec{\Gamma}_{6\times1} \rangle \qquad \text{Eq. 4-2}$$

Likewise, the covariance $P_{\Delta\vec{s}}$ of the focal plane coordinate errors is computed via:

$$P_{\Delta\vec{s}} = \langle (\Delta\vec{s}(t) - \langle \Delta\vec{s}(t) \rangle)(\Delta\vec{s}(t) - \langle \Delta\vec{s}(t) \rangle)^T \rangle \qquad \text{Eq. 4-3a}$$

$$P_{\Delta\vec{s}} = H_{2\times6} \langle \Delta\vec{\Gamma}_{6\times1} \Delta\vec{\Gamma}^T_{1\times6} \rangle H^T_{6\times2} - H_{2\times6} \langle \Delta\vec{\Gamma}_{6\times1} \rangle \langle \Delta\vec{\Gamma}^T_{1\times6} \rangle H^T_{6\times2} \qquad \text{Eq. 4-3b}$$

$$P_{\Delta\vec{s}} = H_{2\times6} P_{\Delta\Gamma} H^T_{6\times2} \qquad \text{Eq. 4-3c}$$

Here $P_{\Delta\Gamma}$ is the 6×6 covariance matrix of the scan coefficient errors. A representative scan coefficient covariance is computed by employing a sufficient number of the line-to-line individual scan coefficient error vectors from the least squares process via a "moving window" approach.

While the covariance model does not appear directly in the MRC process equations, it is important to being able to execute "on the-fly" statistical consistence checks and detection junction measurement outlier rejection.

5. Platform Error Inversion Process

The estimated errors in the scan coefficients are related on a line-by-line basis to knowledge errors in the fifteen parameters of the platform support data (sensor position (3) and velocity (3), attitude angles (3) and rates (3), ground point location (3)). It is assumed that the underlying platform parameter knowledge errors are constant across an image line. One then employs all the valid junction measurements for a particular line and then inverts the $1^{st}$-order error model via an over determined least squares process as follows.

Specifically, at each detector junction one has:

$$\Delta \vec{s}(t) = H_{2\times 6}\Delta \vec{\Gamma}_{6\times 1} == H_{2\times 6}D_{6\times 15}\Delta \vec{\Psi}_{15\times 1} \qquad \text{Eq. 5-1a}$$

$$D_{6\times 15} = \begin{pmatrix} \frac{\partial \Gamma_1}{\partial \omega} & \frac{\partial \Gamma_1}{\partial \phi} & \frac{\partial \Gamma_1}{\partial \kappa} & \frac{\partial \Gamma_1}{\partial \dot{\omega}} & \frac{\partial \Gamma_1}{\partial \dot{\phi}} & \frac{\partial \Gamma_1}{\partial \dot{\kappa}} & \frac{\partial \Gamma_1}{\partial X} & \frac{\partial \Gamma_1}{\partial Y} & \frac{\partial \Gamma_1}{\partial Z} & \frac{\partial \Gamma_1}{\partial X_c} & \frac{\partial \Gamma_1}{\partial Y_c} & \frac{\partial \Gamma_1}{\partial Z_c} & \frac{\partial \Gamma_1}{\partial \dot{X}_c} & \frac{\partial \Gamma_1}{\partial \dot{Y}_c} & \frac{\partial \Gamma_1}{\partial \dot{Z}_c} \\ \vdots & \vdots & \vdots & \vdots & \vdots & \vdots & \vdots & \vdots & \vdots & \vdots & \vdots & \vdots & \vdots & \vdots & \vdots \\ \frac{\partial \Gamma_6}{\partial \omega} & \frac{\partial \Gamma_6}{\partial \phi} & \frac{\partial \Gamma_6}{\partial \kappa} & \frac{\partial \Gamma_6}{\partial \dot{\omega}} & \frac{\partial \Gamma_6}{\partial \dot{\phi}} & \frac{\partial \Gamma_6}{\partial \dot{\kappa}} & \frac{\partial \Gamma_6}{\partial X} & \frac{\partial \Gamma_6}{\partial Y} & \frac{\partial \Gamma_6}{\partial Z} & \frac{\partial \Gamma_6}{\partial X_c} & \frac{\partial \Gamma_6}{\partial Y_c} & \frac{\partial \Gamma_6}{\partial Z_c} & \frac{\partial \Gamma_6}{\partial \dot{X}_c} & \frac{\partial \Gamma_6}{\partial \dot{Y}_c} & \frac{\partial \Gamma_6}{\partial \dot{Z}_c} \end{pmatrix} \qquad \text{Eq. 5-1b}$$

$$\Delta \vec{\Psi}_{15\times 1} = \begin{pmatrix} \Delta \omega \\ \vdots \\ \Delta \dot{Z}_c \end{pmatrix}_{15\times 1} \qquad \text{Eq. 5-1c}$$

One can employ all the valid junction measurement for a particular line to write:

$$\begin{pmatrix} \Delta \vec{s}_1 \\ \Delta \vec{s}_2 \\ \vdots \\ \Delta \vec{s}_M \end{pmatrix}_{2M\times 1} = \begin{pmatrix} {}_1H_1D \\ {}_2H_2D \\ \vdots \\ {}_MH_MD \end{pmatrix}_{2M\times 15} \begin{pmatrix} \Delta \omega \\ \vdots \\ \Delta \dot{Z}_c \end{pmatrix}_{15\times 1} \qquad \text{Eq. 5-2a}$$

$$\Delta \vec{S}_{2M\times 1} = \Theta_{2M\times 15}\Delta \Psi_{15\times 1} \qquad \text{Eq. 5-2b}$$

The resulting least squares solution over M valid junctions is:

$$\Delta \vec{\Psi}_{15\times 1} = \{(\Theta^T\Theta)^{-1}\Theta^T\}_{15\times 2M}\Delta \vec{S}_{2M\times 1} \qquad \text{Eq. 5-3a}$$

$$\Theta_{2M\times 15} = \begin{pmatrix} {}_1H_1D \\ {}_2H_2D \\ \vdots \\ {}_MH_MD \end{pmatrix}_{2M\times 15} \qquad \text{Eq. 5-3b}$$

Hence, one can estimate the platform parameter knowledge errors on a line-by-line basis and employ these estimates along with the a priori knowledge estimates to improve the knowledge of the platform parameters throughout an image. Indeed, one can iteratively feedback these improved platform position errors to iterate the MRC correction process; thus improving overall algorithm robustness and accuracy.

6. MRC Summary Description

According to the exemplary embodiments, the MRC approach described herein in detail includes certain assumptions upon which the approach is constructed. These assumptions are:

Assumption 1: The resulting system of coupled $1^{st}$-order differential equations may be integrated over the associated time increment by holding the scan coefficients constant.

Assumption 2: The error propagation characteristics of the linear scan equations can be determined via a $1^{st}$-order perturbation of the state transition matrix and the associated forcing vector via additive scan coefficient errors.

Assumption 3: While the scan coefficients obtained from the linear scan equations will vary at each detector junction; it is assumed that a single set of scan coefficient errors can be obtained across all the detector junctions via a least squares process that is consistent with the measured junction coordinate residuals.

Assumption 4: The knowledge errors in the platform support parameters can be assumed constant across an individual scan line.

Figure 7:
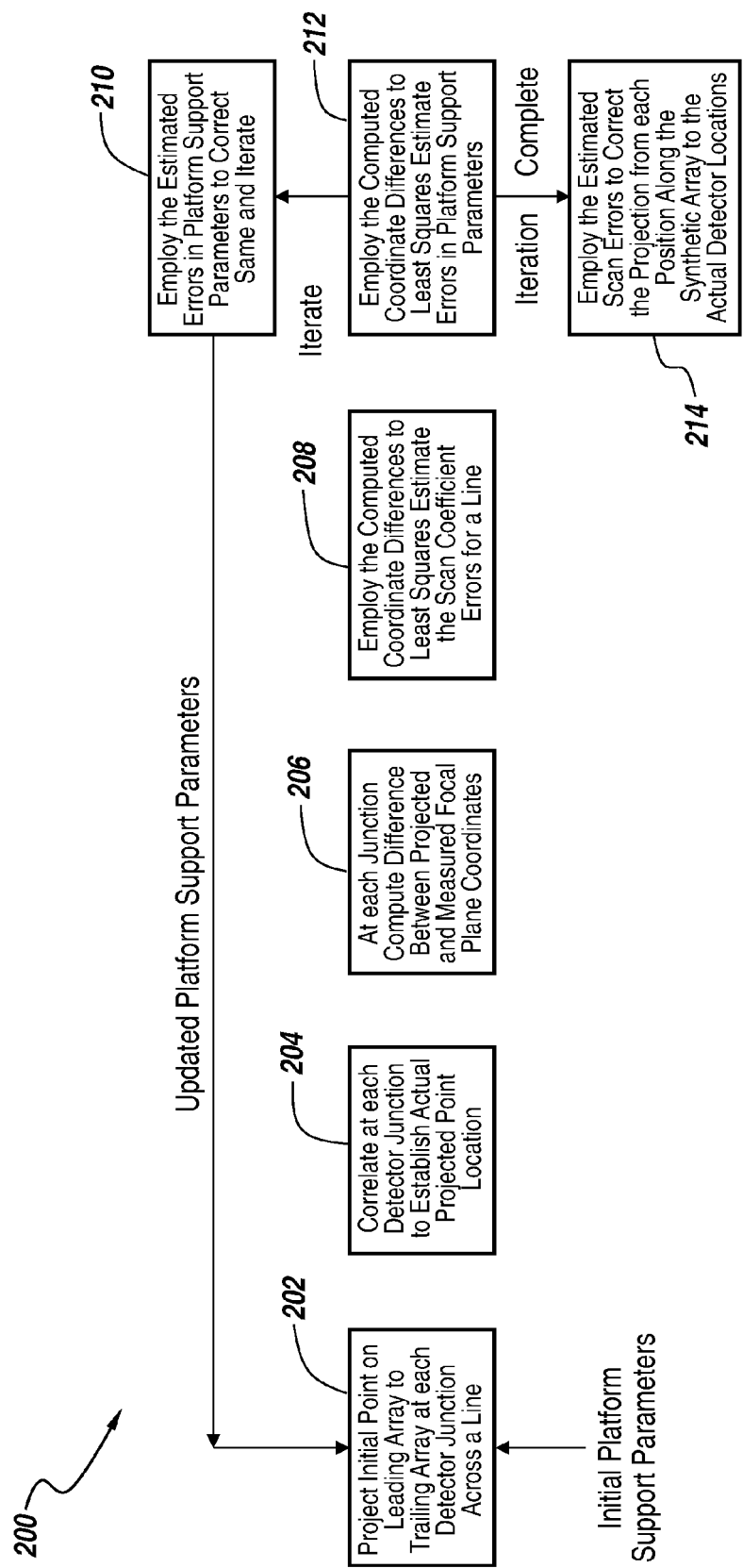
FIG. 7 includes a schematic logical flow diagram of a line-by-line MRC computational process, according to some exemplary embodiments.

FIG. 7 includes a schematic logical flow diagram of the line-by-line MRC computational process, according to some exemplary embodiments. Referring to FIG. 7, it is noted that the entire process is iterative, line-by-line. Specifically, initial platform support parameters are used in step 202 to project an initial point on the leading array to the trailing array at each detector junction across a line. Next, in step 204, correlation at each detector junction is performed to establish actual projected point location. Next, at step 206, at each junction, a difference between projected and measured focal plane coordinates is computed. Next, at step 208, the coordinate differences computed at 206 are used to estimate, for example, by least-squares estimation, the scan coefficient errors for a line. Next, in step 212, the coordinate differences computed at 206 are used to estimate, for example, by least-squares estimation, errors in platform support parameters. If another iteration is required, in step 210, the estimated errors in platform support parameters are used to correct the errors, and flow returns to step 202. In contrast, after step 212, if iteration is complete, in step 214, the estimated scan errors are used to correct the projection from each position along the synthetic array to the actual detector locations. It is noted that the iteration branch depicted in FIG. 7 is optional based on the accuracy of the estimated errors in the support parameters. It should also be noted that in some applications the rate at which the platform position, velocity, attitude angles and rates are measured by on-platform equipment may not support a line-by-line implementation. In these cases one would compute new corrections every m lines, where m is chosen to be consistent with the interpolation accuracy supported by the time sampling granularity.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors and/or controllers executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware, e.g., a controller such as a microcontroller, that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN), a private IP network, an IP private branch exchange (IPBX), a wireless network, e.g., radio access network (RAN), 802.11 network, 802.16 network, general packet radio service (GPRS) network, HiperLAN, and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA) network, global system for mobile communications (GSM) network, and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to example embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The invention claimed is:

1. A method of misregistration correction in a line scanning imaging system, comprising:
providing the line scanning imaging system with a forward array of optical detectors and a trailing array of optical detectors for receiving optical signals from a scene being scanned and converting the optical signals into electrical signals, the forward array of optical detectors receiving the optical signals at a different time than the trailing array of optical detectors receives the optical signals, the forward array of optical detectors and the trailing array of optical detectors defining a plurality of detector junction overlap regions;

receiving the electrical signals at a processor;

processing the received electrical signals with the processor, the processing comprising the steps of:

generating a model of scan motion over a focal plane of the imaging system, using a coupled system of linear scan equations with constant coefficients;

estimating programmed motion positions across the plurality of detector junction overlap regions via a state transition matrix solution to the linear scan equations;

at each detector junction overlap region, measuring actual motion positions via image correlation of overlapping detectors;

generating differences between the actual motion positions and the estimated programmed motion positions;

estimating updates to the constant coefficients based on the generated differences;

generating corrections from the estimated updates to remove unwanted motion; and applying the updates to the constant coefficients;

wherein the steps of generating a model of scan motion, estimating programmed motion positions, measuring actual motion positions, generating differences, estimating updates, generating corrections and applying the updates are performed by means of a non-transitory computer-usable medium having computer-readable code that, when executed by the processor, cause the processor to perform the steps.

2. The method of claim 1, wherein estimating updates is performed using least-squares estimation.

3. The method of claim 1, wherein the image correlation comprises normalized cross-correlation.

4. The method of claim 1, wherein the image correlation comprises lag product cross-correlation.

5. The method of claim 1, wherein the image correlation comprises least squares cross-correlation.

6. The method of claim 1, wherein the model of scan motion is generated over a predetermined time interval.

7. The method of claim 1, wherein the linear scan equations comprise a set of differential equations with constant coefficients.

8. The method of claim 7, wherein the differential equations are first-order differential equations.

9. The method of claim 1, further comprising computing the linear scan equation coefficients using sensor platform parameters.

10. The method of claim 9, wherein the sensor platform parameters comprise at least one of sensor position, velocity, attitude angles and rates.

11. The method of claim 10, further comprising approximating errors in the linear scan equation coefficients from measurement errors in the platform parameters.

12. The method of claim 11, further comprising generating a covariance matrix of focal plane coordinate errors.

13. The method of claim 10, further comprising estimating platform parameter errors from the differences between the actual motion positions and the estimated programmed motion positions.

* * * * *